United States Patent [19]

Rehman et al.

[11] Patent Number: 4,553,701
[45] Date of Patent: Nov. 19, 1985

[54] FOAM GENERATING NOZZLE

[75] Inventors: William R. Rehman, Vermillion; James C. Smith, Lorain, both of Ohio

[73] Assignee: Nordson Corporation, Amherst, Ohio

[21] Appl. No.: 436,012

[22] Filed: Oct. 22, 1982

[51] Int. Cl.$^4$ ............................................. B05B 7/06
[52] U.S. Cl. .................................................. 239/432
[58] Field of Search ............... 239/432, 590.3, 494, 239/338, 333; 222/146 HE; 427/373; 169/14, 15

[56] References Cited

U.S. PATENT DOCUMENTS

| | | | |
|---|---|---|---|
| 576,762 | 2/1897 | Palmer | 239/521 |
| 587,344 | 8/1897 | Tinsley | 239/509 |
| 604,873 | 5/1898 | Bean | 239/494 |
| 614,883 | 11/1898 | Young | 239/509 |
| 617,472 | 1/1899 | Young | 239/509 |
| 986,201 | 3/1911 | Nilsson | 239/499 |
| 1,178,905 | 4/1916 | Engelmann | 239/521 |
| 1,886,623 | 11/1932 | Barnes | 239/499 |
| 2,161,111 | 6/1939 | Wilcoxson et al. | 299/74 |
| 2,164,411 | 7/1939 | Kennedy | 239/499 |
| 2,231,782 | 2/1941 | Thompson | 299/84 |
| 2,624,622 | 1/1953 | Holte | 299/89 |
| 2,760,821 | 8/1956 | Kenney | 299/86 |
| 2,764,452 | 9/1956 | Anderson et al. | 299/83 |
| 2,955,764 | 10/1960 | Hruby, Jr. | 239/206 |
| 3,051,397 | 8/1962 | Hanson | 239/432 |
| 3,446,285 | 5/1969 | Hout | 161/15 |
| 3,547,200 | 12/1970 | Hout | 169/15 |
| 3,625,436 | 12/1971 | Wirths | 239/428.5 |
| 3,633,795 | 1/1972 | Brooks | 239/432 |
| 3,739,989 | 6/1973 | Vosper | 239/399 |
| 3,784,111 | 1/1974 | Piggott | 239/432 |
| 3,797,747 | 3/1974 | Buzzi et al. | 239/311 |
| 3,814,329 | 6/1974 | Clark | 239/426 |
| 3,836,076 | 9/1974 | Conrad et al. | 239/432 |
| 3,946,947 | 3/1976 | Schneider | 239/401 |
| 3,961,754 | 6/1976 | Kuhns et al. | 239/289 |
| 4,059,714 | 11/1977 | Scholl et al. | 222/146 HE |
| 4,071,195 | 1/1978 | Kuhns et al. | 239/289 |
| 4,103,876 | 8/1978 | Hasselman, Jr. et al. | 366/178 |
| 4,141,507 | 2/1979 | Rump | 239/590.5 |
| 4,247,581 | 1/1981 | Cobbs, Jr. et al. | 427/373 |
| 4,330,086 | 5/1982 | Nysted | 239/432 |

FOREIGN PATENT DOCUMENTS 7924574 8/1979 Fed. Rep. of Germany .
2081606 5/1960 United Kingdom .

Primary Examiner—Andres Kashnikow
Assistant Examiner—Scott D. Malpede
Attorney, Agent, or Firm—Wood, Herron & Evans

[57] ABSTRACT

A foam generating nozzle is provided for converting a liquid containing a gas maintained under pressure in solution in the liquid, to a foam for application to a substrate. Complete foaming of the solution is accomplished prior to discharge from the nozzle. This assures in some applications complete atomization before contact with the substance to be coated.

9 Claims, 5 Drawing Figures

FOAM GENERATING NOZZLE

FIELD OF THE INVENTION

This invention relates generally to coating and finishing equipment and, more particularly, to an improved foam generating nozzle used in the application of film-forming solids including high solids compositions.

BACKGROUND OF THE INVENTION

The problems associated with techniques known in the coating and finishing industry for the application of a coating to a substrate have been detailed in U.S. Pat. No. 4,247,581 to Cobbs, Jr., et al. Reference to such patent should be made for a detailed treatment of that subject, but it may be briefly stated for purposes of the present invention that the coating and finishing industry, despite extensive research and development effort, remains predominantly dependent on the use of solvent-containing coatings. It has been suggested that possibly the most serious concern of the industry today, considering both raw material usage and problems with environmental effects, concerns the solvent components of paint. In a spray coating application of a resinous material, the resinous material is typically dissolved in an organic solvent to provide a viscosity suitable for spraying This is required because it has been found that at each stage of the process for atomizing and conveying a resinous material in liquid form to a substrate, the liquid resists high speed deformation. Organic solvents are added to the resinous liquid because they have the effect of separating the molecules of resinous material and facilitating their relative movement making the solution more deformable at high speeds and therefore more susceptible to atomization. While a great deal of effort has been expended to reduce the volume of liquid solvent components in preparing high solids coating compositions containing above 50% by volume of polymeric and pigmentary solids, little success has been achieved. Most high solids coating compositions still contain from 15-40% by volume of liquid solvent components.

The problem with such a high volume content of liquid solvents is that during handling, atomization or deposition of solvent coating compositions, the solvents will escape and can become air contaminants if not properly trapped. Moreover, once a solvent coating is applied to a substrate the solvents are susceptible to escape from the film by evaporation and such evaporated solvents also contaminate the surrounding atmosphere. In addition, since most solvents react with oxidants, pollution problems of toxicity, odor and smog may also be created. Generally, attempts at overcoming such environmental problems are costly and relatively inefficient.

The invention disclosed in the '581 patent mentioned above is a method and apparatus for atomizing and conveying high solids paint or other film forming solids to a substrate for coating. In accordance with the method disclosed in the '581 patent, polymeric compositions having little or no solvent content and viscosities in the range of 300-30,000 centipoises are first foamed to a relatively stable energized state and thereafter subjected to an atomizing force for uniform coating of a substrate. An important element of the '581 invention is the recognition that the use of an energized, relatively stable foam in coating applications eliminates many of the major problems existing in the finishing and coating industry including a drastic reduction or elimination of the use of organic solvents. In contrast to conventional spraying or coating systems wherein foam was suppressed during the manufacture, pigmenting, tinting, and application of paint or coating materials to a substrate, it was found as disclosed in the '581 patent that an exceptional surface coating could be achieved by first converting a film forming solid into a foamed state and then disintegrating or atomizing the foam using known techniques.

Given the teachings of the '581 patent that it is desirable to convert high solid paint or other film forming solids to a foam prior to atomization and conveyance to a substrate, it should be stated that there are basically two generally used techniques to convert a liquid into a foam material. As discussed in U.S. Pat. No. 4,059,714 to Scholl, et al, for example, one method of producing a foam material from liquid involves the injection of air or a gas such as nitrogen into the liquid under a suitable pressure. The gas is forced into solution with the liquid and when the liquid-gas solution is subsequently dispensed into atmospheric pressure, the gas comes out of solution and becomes entrapped in the liquid to form a closed cell solid foam. The gas essentially evolves from the solution under atmospheric pressure in the form of small bubbles, causing the surrounding liquid to expand volumetrically. The result is a homogeneous solid foam having closed air or gas cells evenly distributed throughout. In the alternative, as disclosed for example in the '581 patent discussed above, a so-called blowing agent may be placed into solution with a liquid under appropriate temperature and pressure conditions. When the solution is exposed to a pressure less than that required to maintain the blowing agent in solution, gas bubbles are produced and trapped in the liquid, forming a closed cell solid foam.

Several parameters must be observed in the process of creating and/or atomizing the foam to achieve an even coating of high solids paint or a similar film forming material such as hot melt adhesives on a substrate. The subject invention is primarily directed to improvements in the nozzles utilized to generate and atomize the closed cell solid foam. The problem is one of creating a stable, low density foam which can be atomized prior to contact with the substrate. It was found using conventional paint or fluid nozzles that the point of formation of the high solids paint foam could not be adequately controlled. As mentioned above, whether a pressurized gas or a blowing agent is introduced into solution with a liquid to be foamed, the foaming will not occur until the solution is exposed to a pressure less than the maintenance pressure of the solution. Experiments with conventional fluid nozzles have shown that foaming of a solution containing high solids paint often occurred several inches from the end of the nozzle. As is well known, air jets or similar means are typically disposed immediately adjacent the end of foam nozzles to disintegrate or atomize the foam prior to contact with the substrate. This assures even coating of the substrate. It can be appreciated that if foaming does not occur immediately at the point of exit from the nozzle, then complete atomization of the foam is impossible. The result is uneven coating of even coating of the substrate. It can be appreciated that if foaming does not occur immediately at the point of exit from the nozzle, then complete atomization of the foam is impossible. The result is uneven coating of the substrate, running or dripping of the paint and similar problems.

In addition to the problem of forming the foam at the proper time, prior art foam nozzles tend to cause sputtering or non-uniform flow of the stream of foam formed from a high solids coating or similar material. It has been found that such a problem creates the same undesirable results as incomplete atomization of the foam discussed above.

It is therefore an objective of this invention to provide a nozzle assembly for converting a liquid containing gas maintained under pressure in the liquid to a foam for application to a substrate.

It is another object herein to provide a nozzle assembly capable of producing complete foaming of a solution containing a liquid and a gas maintained under pressure in the liquid, prior to the discharge of the liquid from the nozzle assembly, to assure complete atomization upon discharge.

SUMMARY OF THE INVENTION

The invention herein which achieves these objectives comprises a foam generating nozzle construction in which foaming of high solids paint or other relatively high density film forming solids such as adhesives is accomplished prior to the point at which the paint exits the nozzle. A plug is disposed at one end of a foaming chamber and a discharge orifice is disposed at the other end of the chamber. A passage is formed in the plug, having a cross-sectional area at least as small as the cross-sectional area of the discharge orifice and preferably five to ten times smaller than that of the discharge orifice.

A solution of high solids paint, for example, and air or a blowing agent, under pressure, is introduced into a high pressure chamber disposed on the other side of the plug from the foaming chamber. The cross-sectional area of the discharge orifice is sufficiently large to introduce air within the foaming chamber at a pressure approaching atmospheric. In a preferred embodiment of this invention, the passage is formed in the plug at an included angle of approximately 30°, plus or minus 10°, measured relative to the longitudinal axis of the plug or the side walls of the chamber, so that the pressurized solution of high solids paint and gas or a blowing agent will flow through the passage and impact against the side-walls of the foaming chamber at such angle. In combination with the reduced pressure existing in the foaming chamber, the impacting of the pressurized solution against the foaming chamber's side walls at such angle induces air bubbles to come out of solution to form a closed-cell solid foam. Upon exiting the foaming chamber through the discharge orifice, the high solids paint foam is atomized using conventional means as discussed in detail below.

In other embodiments of this invention, it will be shown that the angle at which the solution of high solids paint and air or a blowing agent impacts against the side walls of the foaming chamber may be essentially duplicated by other means. In particular, a sphere may be disposed in the foaming chamber immediately adjacent the outlet of the passage such that the pressurized solution impacts the foaming chamber. In the alternative, a wire or similar obstruction may be disposed within the foaming chamber at an angle relative to the passage to accomplish the same angled impacting of the pressurized solution as it enters the foaming chamber.

DESCRIPTION OF THE DRAWINGS

The structure, operation and advantages of the foam generating nozzle herein will become apparent upon consideration of the following discussion taken in conjunction with the accompanyinq drawings, wherein.

DETAILED DESCRIPTION OF THE INVENTION

Figure 1:
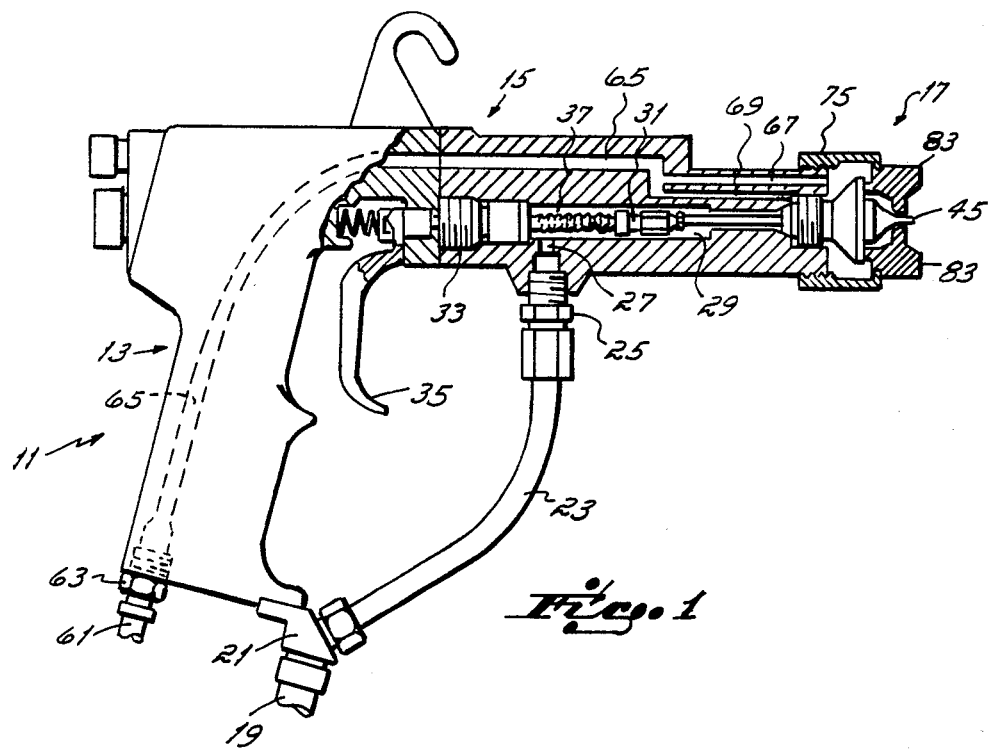
FIG. 1 is a side view in partial cross section of a spray gun incorporating the foam generating nozzle of this invention.

The spray gun labeled generally with the reference 11 in the drawings is a modification of that disclosed in U.S. Pat. No. 4,241,880, which is assigned to the same assignee as the present invention. Spray gun 11 generally includes a handle assembly 13, a barrel assembly 15 and nozzle assembly 17 which incorporate two distinct delivery systems; one for the conveyance of pressurized air to the nozzle of the gun 11, and a second for the conveyance of a liquid solution consisting of a film-forming solid and a blowing agent to the nozzle.

Figure 2:
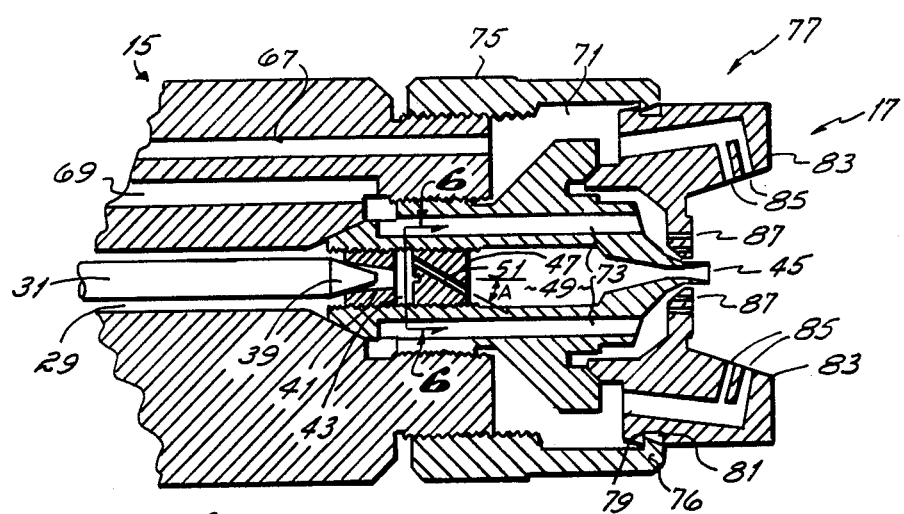
FIG. 2 is an enlarged view of the foam generating nozzle portion of the spray gun shown in FIG. 1.

Referring now to FIGS. 1 and 2, the system for conveying a pressurized liquid solution through gun 11 will be considered first. As mentioned above, and discussed in detail in the '581 patent to Cobbs, Jr., et al, the initial step in the creating of a high solids foam is the formation of a pressurized solution consisting of either a blowing agent or gas and a high viscosity paint or other film-forming solid. Formation of this solution is described in the above identified '581 patent, and therefore the disclosure contained in the '581 patent is hereby incorporated by reference for purposes of completing the disclosures of this application relative to the formation of such solutions. For purposes of the present discussion, the solution will be considered to include a film-forming solid such as paint or a hot melt adhesive and a blowing agent.

The pressurized solution is introduced into gun 11 through a hose 19 connected to one side of a lug 21 attached to the lower end of the handle assembly 13. The lug 21 includes a fluid passage so as to convey the solution from hose 13 into a second hose 23 which is connected at the other end of lug 21. The second hose 23 extends from lug 21 and is connected at its other end to the barrel assembly 15 of gun 11 through a threaded inlet port 25 which communicates with an inlet passage 27. In turn, inlet passage 27 communicates with the rearward end of a central, annular passage 29 which extends axially along the barrel assembly 21 and forwardly to the nozzle assembly 17 of gun 11.

Axially disposed within the annular passage 29 is a control rod 31 which governs the flow of solution to the nozzle assembly 17. The control rod 31 is mounted at its rearward end in a Delrin packing nut 33 and extends outwardly therefrom to a trigger 35 mounted to the barrel assembly 15 of gun 11. The trigger 35 is biased forwardly toward the nozzle assembly 17 of gun 11 by a spring 36 mounted between the handle assembly 13 and trigger 35. A flexible bellows seal 37 is disposed along a portion of control rod 31 such as described in detail in U.S. Pat. No. 4,079,894 assigned to the assignee of this invention. The trigger 35 is operable to axially reciprocate control rod 31 within annular passage 29.

The forward end of control rod 31 terminates in a cone-shape tip 39 as shown in more detail in FIG. 2. The cone-shape tip 39 of control rod 31 is engagable with a seat 41 to open and close the flow of solution from within the annular passage 29 to a high pressure chamber 43 disposed immediately forward of seat 41 toward the nozzle assembly 17. When the trigger 35 is pulled rearwardly compressing spring 36, the control rod 31 is retracted thereby retracting the cone-shape tip 39 from seat 41 allowing solution in annular passage 29 to enter the high pressure chamber 43. When the trigger 35 is released, the spring 36 urges control rod 31 forwardly so that its cone-shaped tip 39 engages seat 41 thereby isolating annular passage 29 from the high pressure chamber 43.

The solution of high solids paint and a blowing agent is conveyed from hose 13 and through gun 11 to the high pressure chamber 43 as discussed above. It should be understood that throughout the transfer of the solution along this path, the solution is maintained at a pressure above that of the so-called solution maintenance pressure or the pressure required to prevent the blowing agent from leaving solution and thus forming a foam. As discussed above, once the solution maintenance pressure is lowered, foaming of the film forming solid will begin to occur. The problem to which this invention is directed involves the formation of such foam at the desired point in nozzle assembly 17 so that problems of sputtering and incomplete atomization may be overcome.

Figure 3:
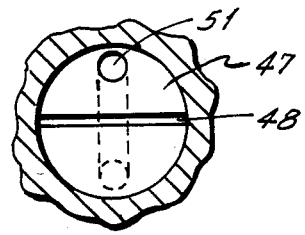
FIG. 3 is a cross-sectional view taken generally along line 3—3 of FIG. 2.

Nozzle assembly 17 further includes a discharge orifice 45 through which the foamed solution is emitted, as discussed below, and a plug 47 which together define the boundries of a foaming chamber 49. The plug 47 is disposed at one end of foaming chamber 49 immediately adjacent high pressure chamber 43. In one embodiment of the subject invention, a passage 51 is formed in plug 47 and is disposed at an acute angle relative to the sidewalls of foaming chamber 49 and the longitudinal axis of plug 47. As shown in FIG. 3, plug 47 includes a slot 48 which can be rotated without effecting the position and angle of the passage 51, facilitating easy removal. The cross-sectional area of passage 51 is at least as small as the cross-sectional area of discharge orifice 45, and preferably from five to ten times or more smaller than the cross-sectional area of discharge orifice 45 in one embodiment. Due to such size differential between discharge orifice 45 and passage 51, the pressure within foaming chamber 49 is much less than that in high pressure chamber 43, and well below the maintenance pressure of the solution. It has been found that as the solution is introduced through passage 51 and impacts against the side walls of foaming chamber 49, gas bubbles come out of solution and become entrapped in the high solids paint to form a closed-cell solid foam. The foam formed within chamber 49 is pushed toward the discharge orifice 45 as additional solution released from high pressure chamber 43 enters foaming chamber 49, and such foam exiting through discharge orifice 45 is then atomized by known means as described in more detail below.

Experimentation has shown that easily atomized, low density foam can be produced in foaming chamber 49 only if various parameters are met. It has been observed that to achieve complete foaming of the high solids paint or other film forming solid within foaming chamber 49, the cross-sectional area of the passage 51 must be at least as small as the cross-sectional area of discharge orifice 45 and preferably between five and ten times or more smaller than orifice 45. In one experiment, a passage 51 having an internal diameter of 0.028" was utilized with a discharge orifice 45 having an internal diamter of 0.082". In terms of cross-sectional area, this meant that the discharge orifice 45 was approximately eight and one-half times as large as that of the passage 51. Experiments conducted using this relationship indicated that a low density foam was produced within foaming chamber 49 which was easily atomized. Tests conducted where the discharge orifice 45 and passage 51 were more nearly equal in cross-sectional area produced foam within foaming chamber 49 having a higher density making it difficult to break up through atomization when released from discharge orifice 45.

In addition, it is preferred to subject the solution flowing from high pressure chamber 43 through passage 51 to some form of obstruction within the foaming chamber 49. In the preferred embodiment of this invention shown in FIG. 2, the passage 51 is formed in plug 47 at an angle A of about 30°, plus or minus 10°, with respect to the longitudinal axis of the plug 47 and the walls of foaming chamber 49. It has been found that by using some form of obstruction means which the stream of solution impacts at such an acute angle, foaming of the high solids paint will occur within foaming chamber 49 before being emitted from the discharge orifice 45. In FIG. 2, the obstruction means is defined by the walls of foaming chamber 49.

Figure 4:
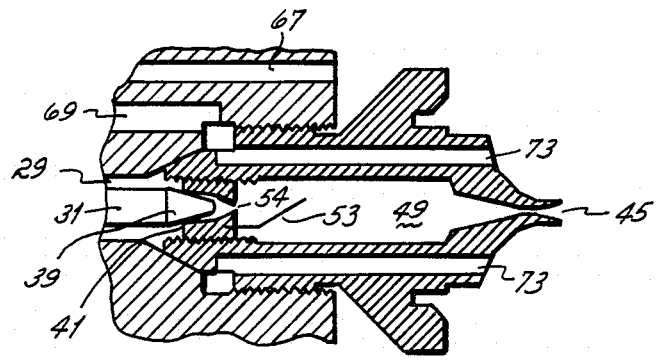
FIG. 4 is an alternate embodiment of the foam generating nozzle herein.
Figure 5:
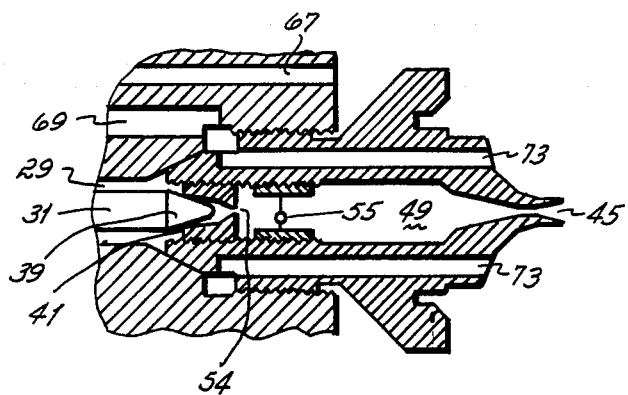
FIG. 5 is a still further embodiment of the foam generating nozzle of this invention.

FIGS. 4 and 5 show alternatives to the obstruction means of FIG. 2 in which the plug 47 is eliminated and solution flows from annular passage 29 to a constructed passage 54 formed at the rearward end of seat 41. In FIG. 4, a flat plane 53 is disposed within foaming chamber 49 immediately adjacent the constricted passage 54 so that the solution exiting high pressure chamber 43 is deflected from flat plane 53 which is disposed at an angle of approximately 30°, plus or minus 10° relative to the longitudinal axis of passage 54. In FIG. 5 a sphere 55 is disposed immediately adjacent constricted passage 54 within foaming chamber 49 so that its center is offset relative to the path of the solution exiting release orifice 51. In both embodiments shown in FIGS. 4 and 5 the constricted passage 54, and the flat plane 53 or sphere 55 obstruction means, are preferably disposed at such an angle relative to one another that the solution is shocked or disturbed to an extent where optimum foaming is achieved.

The preferred angle of 30°, plus or minus 10°, at which the pressurized solution contacts an obstruction means, avoids problems of sputtering and incomplete atomization which are possible with prior nozzle assemblies. For example, existing nozzle assemblies generally include a single discharge orifice for the release of solution from the gun. In such prior nozzles little or no foaming occurs within the nozzle itself but begins only after the solution is released from the discharge orifice into the atmosphere. It can be appreciated that unless complete or nearly complete foaming occurs immediately after emission of the solution from the spray gun, incomplete atomization can occur. In fact, it has been found that depending on the flow rate, foaming of a solution containing high solids paint and a blowing agent may not occur using conventional nozzle assemblies until the solution has moved several inches from the discharge orifice. It is apparent that atomization means associated with those nozzle assemblies are ineffective due to atomizing the solution prior to foaming. As discussed above, the spray gun 11 herein avoids this problem by assuring that foaming occurs within foaming chamber 49 prior to emission from the discharge orifice 45.

A further advantage of disposing the obstruction means at an angle of 30°, plus or minus 10°, relative to the path of the solution is that proper shocking or agitation of the solution is achieved, thus enhancing the evolution of the proper density of bubbles which cause the surrounding liquid to expand volumetrically. It has been found that foaming is restricted where the obstruction means is disposed at angles approaching 90° relative to the path of the solution, since the bubbles evolving from the solution tend to be broken up. As a result, the extent of foaming is reduced making atomization difficult.

The importance of achieving production of foam having a proper density at or immediately adjacent the point of exit from discharge orifice 45 is apparent upon consideration of the system of spray gun 11 for delivering pressurized air to the nozzle assembly 19. A hose 61 is connected on one end to an air inlet 63 mounted in the butt of handle assembly 13. The other end of hose 61 is connected to a source of pressurized air (not shown). Air inlet 63 communicates with an air passage 65 which extends upwardly through handle assembly 13 toward the nozzle assembly 17 where it separates into an upper and lower branch duct or conduit 67 and 69 respectively. Upper branch conduit 67 extends forwardly into an annular air chamber 71, while the lower branch duct 69 communicates with a plurality of circumferentially spaced axial passages 73 which extend linearly along the length of foaming chamber 49.

Nozzle assembly 17 further includes an annular retaining ring 75 which is threaded over a correspondingly threaded section of barrel assembly 15 at one end. The other end of annular retaining ring 75 includes a lip 76 over which an air cap 77 is disposed, with the lip 76 engaging a wall 79 in an annular groove 81 formed in the outside surface of the air cap 77 such that the air cap 77 is securely retained and sealed against the escape of air to the atmosphere. The air cap 77 is formed with opposed air horns 83 each having angled openings 85 which face inwardly toward the discharge orifice 45. The openings 85 in air horns 83 communicate with the annular air chamber 71. In addition, a plurality of axial orifices 87 are formed in air cap 77 immediately adjacent and generally parallel to the discharge orifice 45. Axial orifices 87 communicate with axial passages 73.

Pressurized air is thus conveyed through hose 61, air passage 65, upper and lower branch conduits 67 and 69 to the annular air chamber 71 and the axial passages 73. Air traveling through the axial passages 73 exits the nozzle assembly 17 through axial orifices 87 which atomizes the foam emitted from discharge orifice 49. From annular air chamber 71, the pressurized air flows through the openings 85 in opposed air horns 83 where it impinges against the foam exiting discharge orifice 49 and performs the dual function of atomizing the foam and also shaping the pattern in which the foam is delivered to a substrate as it exits spray gun 11. As discussed above, the proximity of axial orifices 87 and openings 85 to the discharge orifice 45 require that foaming of the high solids paint be complete at or immediately adjacent discharge orifice 45. This is accomplished by the invention herein since foaming of the high solids paint occurs within foaming chamber 49 and not exterior to the discharge orifice 45.

Throughout this specification and claims the term "solution" has been used to describe the liquid gas dispersion supplied under high pressure to the gun, which dispersion when dispensed from the gun at atmospheric pressure cools and creates a coating. The applicants are of the view that this mixture is a true solution in which the molecules of the dissolved gas are dispersed among those of the liquid. The term though as used in the specification and the claims of the application is intended to define and encompass the broader generic definition of solution which is a gas homogenously mixed with the liquid, whether or not the molecules of the dissolved gas are in fact dispersed among those of the solvent.

Although the invention has been described in terms of three different preferred embodiments, persons skilled in the art to which this invention pertains will readily appreciate other modifications and changes which may be made without departing from the spirit of the invention. Therefore, we do not intend to be limited except by the scope of the appended claims.

Thus having described the invention, what is claimed is:

1. A nozzle assembly for converting a liquid/gas solution into a foam, the gas being maintained under pressure in solution in the liquid, said nozzle assembly comprising:
   chamber means including an obstruction for receiving the liquid/gas solution and causing the gas to leave solution and form a foam, said chamber means having a pressure lower than that required to maintain the gas in solution in the liquid;
   a discharge orifice communicating with said chamber means;
   delivery means including an inlet passageway communicating with said chamber means for directing the liquid/gas solution to said chamber means while maintaining the gas in solution;
   said inlet passageway directing the liquid/gas solution into said chamber means and into engagement with said obstruction to agitate the liquid/gas solution, the agitation of the liquid/gas solution within said chamber means inducing the gas to leave solution and form a foam within said chamber means, said foam thereafter being emitted from said chamber means through said discharge orifice.

2. The nozzle assembly of claim 1 further including means for atomizing said foam emitted from said discharge orifice.

3. The nozzle assembly of claim 1 in which the cross-sectional area of said discharge orifice is at least five times greater than the cross-sectional area of said inlet passageway.

4. The nozzle assembly of claim 1 further including a plug having a longitudinal axis, said inlet passageway being formed in said plug at an acute angle in the range of about 20°–40° relative to said longitudinal axis of the plug.

5. The nozzle assembly of claim 1 in which said chamber means includes an inner wall, said inlet passageway delivering the liquid/gas solution under pressure into engagement with said inner chamber wall, said inner chamber wall forming said obstruction to agitate the liquid/gas solution.

6. The apparatus of claim 1 wherein said obstruction is a wire means disposed within said chamber means in the path of said liquid/gas solution so that said liquid/gas solution contacts said wire means at an acute angle.

7. The apparatus of claim 1 wherein said acute angle is in the range of about 20°–40°.

8. The apparatus of claim 1 wherein said obstruction is a sphere means disposed within said chamber means in the path of said liquid/gas solution so that said liquid/gas solution contacts said sphere means at an acute angle.

9. The apparatus of claim 8 wherein said acute angle is in the range of about 20°–40°.

* * * * *